Figure 1:
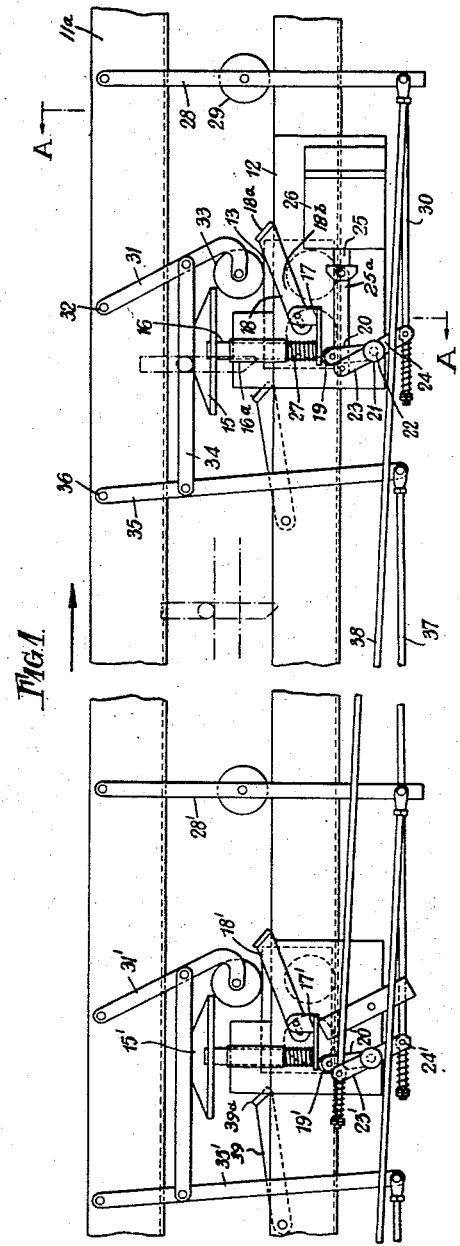

Aug. 30, 1960

D. M. KING

2,950,688

CONVEYOR SYSTEMS

Filed July 24, 1958

2 Sheets-Sheet 1

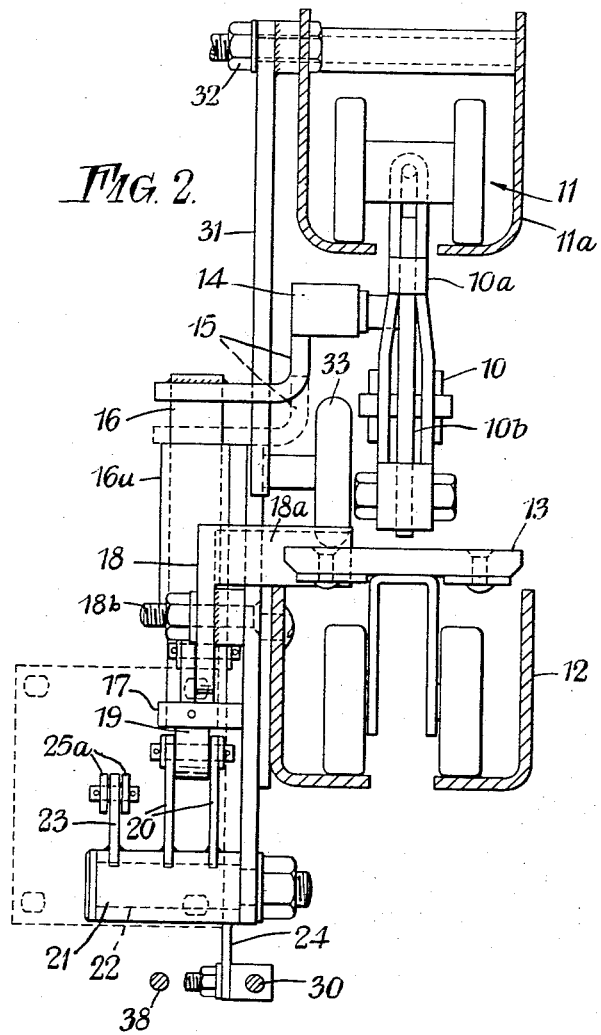

United States Patent Office

2,950,688
Patented Aug. 30, 1960

2,950,688

CONVEYOR SYSTEMS

Donald Mayer King, Argyle Works, Stevenage,
Hertfordshire, England

Filed July 24, 1958, Ser. No. 750,800

Claims priority, application Great Britain July 25, 1957

7 Claims. (Cl. 104—172)

This invention relates to conveyor systems and more particularly to such systems of the type wherein load carrying trolleys are propelled along a fixed over head track by virtue of the engagement therewith of pusher dogs or driving abutments which depend from an endless driven chain travelling along a path above the aforesaid track.

It is the object of the invention to provide in a conveyer system of the kind set forth an improved indexer mechanism whereby the passage of load trolleys along certain sections of the fixed track may be controlled.

According to the invention in a conveyor system of the kind set forth a plurality of holding stations is disposed at spaced points along a selected section of the conveyor path, there being means at each station adapted on actuation positively to stop any trolley and means whereby the stoppage of a trolley at one station will result in the actuation of the means at the next preceding station to effect stoppage of the next following trolley thereat. Preferably the stop means at the first or most forward station will normally tend to assume an operative position, there being electrically operated means at such station adapted on actuation to cause said stop means to assume an inoperative position.

In order that the said invention may be clearly understood and readily carried into effect the same will now be more fully described with reference to the accompanying drawings in which:

Figure 1 is a side elevational view illustrating two sets of stop mechanism employed at the first or final station and the second or next preceding station of a series of holding stations, Figure 2 is a view on the line A—A of Figure 1.

Referring to the drawings it will be seen that the conveyor system to which the mechanism of the invention is applied is of known type and comprises an endless driven chain 10 which is supported at spaced points along its length by means of clevis attachments 10a which depend from trolleys 11 running in a fixed overhead track 11a. The chain 10 is also provided at spaced points along its length with pusher dogs or driving abutments 10b. The dogs or abutments 10b are adapted to engage and to propel load carrying trolleys which are supported on a second track 12 disposed vertically below said track 11a. For the purposes of the present description the relevant part of a load carrying trolley is indicated at 13. The pusher dogs or driving abutments 10b are so mounted on the driving chain as to be capable of limited vertical displacement so that they may be moved from an operative position wherein they will abut and impart motion to the load carrying trolleys to an inoperative position shown in full lines in Figure 2 wherein they will ride over the top of the trolleys without imparting any motion thereto and vice versa. As will be seen from Figure 2 each such dog or abutment is conveniently provided with a laterally projecting roller 14 adapted to cooperate with ramp means disposed along the conveyor path thereby to cause upward movement of said dog or abutment during its travel along certain sections of the conveyor path.

In such a conveyor system it is proposed in one or more selected sections of the conveyor path to provide a plurality of holding or storage stations whereat load carrying trolleys may be held temporarily against further movement if so desired. The holding stations will be spaced along the selected section of the conveyor and the arrangement will be such that on stoppage of a trolley at what may be termed the first or final station means will be actuated automatically at the next preceding or second station to stop the next following trolley at said second station. Similarly stoppage of a trolley at said second station will result in the operation of means at the next preceding or third station to stop the next following trolley and so on. In other words stoppage of a trolley at the first or final station will result in stoppage of the next following trolley at the second station with subsequent stoppage of further following trolleys successively at successive preceding stations. The arrangement is also such that upon release of a trolley from the first or final station the mechanism at the second station will be actuated to release the trolley previously held thereat for forward movement to the final station. Similarly, release of the trolley held at the second station will result in release of the trolley held at the third station and so on, the trolleys thus moving up by one station each time a trolley is released from the first or final station.

In Figure 1 the mechanisms at the first or final station and the next preceding station are illustrated and it will be seen that the mechanism at the first or final station comprises a ramp element 15 which is carried by a post or column 16 supported in a suitable guide 16a for limited vertical sliding movement into and out of a position wherein it will engage with the laterally directed rollers 14 on the pusher dogs or abutments 10b and thus be effective to lift the latter clear of any load carrying trolley 13 present at the first or final station. Normally the ramp element 15 will be maintained in its uppermost or operative position as shown, wherein it will be in the path of the aforesaid rollers on the driving dogs or abutments. Affixed at the lower end of the aforesaid post or column 16 is a laterally directed bracket or the like 17 to which is connected by means of a pin and slot connection one arm of a stop lever 18 which latter is mounted for pivotal movement about a stud 18b and is formed at its free end with a laterally directed extension 18a. The arrangement is such that with the ramp element 15 in its upper or operative position the stop lever 18 will be positioned so that the extension 18a will lie in the path of and form a positive stop for any trolley at the first or final station. On downward movement of the ramp element 15 into its inoperative position however said stop lever 18 will be swung upwardly so that the extension 18a will be clear of the path of the trolleys and forward movement of the latter will be allowed. The ramp element 15 is retained in its operative position in the following manner.

Cooperating with the underside of the bracket or the like 17 which is mounted at the lower end of the aforesaid post or column 16 carrying the ramp element, is a roller 19 which is freely mounted between a pair of lever arms 20 which are fixedly mounted on a boss or collar 21 movable angularly about a fixed shaft or pivot 22. Also fixedly mounted on the boss or collar 21 are two further levers 23 and 24 which are slightly angularly offset with respect to said lever arms 20. Coupled to the lever 23 by means of links 25a is the plunger 25 of a solenoid 26 and the arrangement is such that on energisation of the latter an angular movement will be imparted to said lever 23 and hence to the lever arms 20 thereby to cause the roller 19 carried by the latter to move out of contact with the bracket 17. On withdrawal of the roller 19 from contact with the underside of the bracket 17 the ramp element 15 will drop either due to its own weight, or with the assistance of a spring such as is indicated at 27 into its lowermost or inoperative position wherein it will be clear of the laterally directed rollers 14 on the pusher dogs or abutments. Simultaneously with the lowering of the ramp element 15 the stop lever 18 will be swung upwardly out of the path of the trolley previously held at the station and said trolley will be engaged by a pusher dog or abutment and propelled from the station.

In order to reset the mechanism at the first or final station following the release of a trolley therefrom there is disposed at the exit side of such station a pivoted lever 28 which carries a roller 29 adapted normally to lie in the path of movement of the trolleys. Coupled to the pivoted lever 28 is a link 30 which is in turn pivotally connected to the lever 24. The arrangement is such that as a trolley leaves the first or final station it will contact the aforesaid roller 29 on the pivoted lever 28 thereby causing an angular movement to be imparted to the latter, such angular movement being transmitted via the linkage to the lever 24. The angular movement imparted to the lever 24 is in the reverse direction to that imparted by the solenoid 26 on energisation thereof so that the lever arms 20 will also be swung upwardly in the reverse direction, the roller 19 thereon engaging the underside of the bracket or the like 17 and thereby causing the ramp element 15 to be lifted back into its uppermost or operative position. As above explained, due to the connection between the bracket or the like 17 and the pivoted stop lever 18 the latter will also be swung downwardly back into its operative position wherein it will form a positive stop for the next following trolley. Preferably the underside of the bracket 17 will be formed with a groove or depression adapted to provide a positive seating for the roller 19 when the latter is in its operative position.

Also mounted at the first or final station is a depending lever 31 which is pivotally connected at its upper end to a fixed pivot 32 and carries at its lower or free end a roller 33 which is disposed in the path of the load carrying trolleys. At a point intermediate the ends of the depending lever 31 a link 34 is pivotally connected thereto such link being coupled to a second depending lever 35 which is pivotally connected at its upper end to a fixed pivot 36, the pivots of such two depending levers 31 and 35 being located in the same horizontal plane. The depending lever 35 which is longer than the first has a rod 37 pivotally connected to the lower end thereof, such rod being coupled to a lever 24' corresponding to the lever 24 described above and located at the next preceding or second holding station. The mechanism at the second station is similar to that at the first or final station except that the solenoid 26 is omitted. The arrangement is however such that the ramp element 15' (corresponding to the element 15) and the associated stop lever 18' (corresponding to the lever 18) at the second station will normally tend to assume their inoperative positions thereby to allow free passage of trolleys to the first or final station. When however, a trolley arrives and is held at the first or final station it will contact the roller 33 carried by the depending lever 31 and as a result an angular movement will be imparted to the latter which will be transmitted to the lever 35 thereby to cause movement via the rod 37 of the lever 24' at the second station with resultant angular movement of the lever arms 20' (corresponding to the arms 20) carrying the roller 19' (corresponding to the roller 19) the latter thus being caused to engage the bracket or the like 17' (corresponding to the bracket 17) and to urge the ramp element 15' (corresponding to the element 15) and the associated stop lever 18' (corresponding to the lever 18) into their operative positions, wherein they will stop the next following trolley. When however the trolley at the first or final station is released and passes out of contact with the roller 33 on the depending lever 31 the latter will swing in the reverse direction back into its position thereby resetting the lever 35 and rod 37. It will be seen that the lever 28 is also coupled by means of a rod 38 with the lever arm 23' at the second station so that as a trolley leaves the first or final station and contacts the roller 29 to cause angular movement of the lever 28 a longitudinal movement will be imparted to the rod 38 to cause it to impart an angular movement to the arm 23' and hence resetting of the ramp 15' and stop lever 18' at said second station in their inoperative positions so that the trolley previously held at said second station may then be advanced to the first.

It will be appreciated that by providing depending levers 28', 31' and 35' corresponding to the levers 28, 31 and 35 at the second station it will be possible to control the operation of similar stop mechanism at a third station and so on. The stop mechanism at the second, third, fourth and any other stations will be similar to that employed at the first or final station except that the solenoid will be omitted and that the ramp and stop lever will normally tend to assume their inoperative positions being set to their operative positions successively as the next forward station is filled.

Preferably as indicated in Figure 1 there will be provided at each station a pivoted stop arm 39 having an angled end portion 39a adapted to constitute a back stop to prevent any tendency to rearward movement of any trolley held at a station. The construction is such that the arm 39 will be displaced freely upwardly by each trolley as it approaches the station and after said trolley has passed and is in position at the station it will drop down under gravity into its operative position as shown in the drawing.

What I claim is:

1. In a conveyor system wherein load carrying trolleys are propelled along a main track by means of pusher dogs depending from an endless driving chain which is itself suspended from trolleys running on a second track disposed above that on which the load carrying trolleys are caused to run, said pusher dogs being so supported as to be capable of a longitudinal sliding movement at right angles to the chain and each carrying a laterally projecting member, the provision of an indexing mechanism comprising a ramp element slidable upwardly and downwardly into and out of an operative position wherein it will lie in the path of the laterally projecting members carried by the pusher dogs and serve to lift such dogs relatively to the chain and clear of any trolley present on the main track in the region of said ramp element, a stop lever operatively connected to said ramp element so as to be movable therewith into and out of an operative position wherein it will constitute a positive stop for any trolley to which a drive has been discontinued by virtue of the lifting of the dogs, an angularly movable member adjacent the track and adapted normally to hold the ramp element in its operative position, manually operable means adjacent the track for moving said angularly movable member thereby to allow downward movement of the ramp element into its inoperative position with consequent withdrawal of the stop lever from its operative position, and resetting means operable by the trolley released on withdrawal of said stop lever to effect resetting of the angularly movable member to its initial position with consequent restoration of the ramp element and the stop lever to their respective operative positions.

2. An indexing mechanism as in claim 1 in which the angularly movable member comprises an arm movable about a fixed pivot and carrying at its free end a roller adapted to cooperate with the ramp element, there being a solenoid adapted on energisation to impart an angular movement to said arm such as will result in withdrawal of support from said ramp element.

3. An indexing mechanism as in claim 1 in which the resetting means comprise a pivoted member so arranged in relation to the main track as to be actuated by any trolley released by the stop lever, there being link means providing a coupling between said pivoted member and said angularly movable member so that on actuation of the former the latter will be moved back to its initial position thereby restoring the ramp element to its operative position and supporting it in such position.

4. In a conveyor system wherein load carrying trolleys are propelled along a main track by means of pusher dogs depending from an endless driving chain which is itself suspended from trolleys running on a second track disposed above said main track, said pusher dogs being so supported as to be capable of a longitudinal sliding movement at right angles to the chain and each carrying a laterally projecting member, the provision of an indexing mechanism comprising a ramp element slidable upwardly and downwardly into and out of operative position in which operative position it will lie in the path of the laterally projecting members on the pusher dogs and will serve to lift such dogs relatively to the chain and clear of any trolley present on the main track in the region of said ramp element, a stop lever operatively connected to said ramp element so as to be movable therewith into and out of an operative position wherein it will constitute a positive stop for any trolley to which a drive has been discontinued by virtue of the lifting of the dogs, an angularly movable member adjacent the track and adapted normally to hold the ramp element in its operative position, manually operatable means for moving said angularly movable member thereby to allow downward movement of the ramp element into its inoperative position with consequent withdrawal of the stop lever from its operative position, a second ramp element located along the conveyor path at a point preceding the first mentioned ramp element, said second ramp element being slidable upwardly and downwardly into and from an operative position but being arranged normally to assume an inoperative position, a displaceable member adjacent said track adapted to be displaced by any trolley held by the stop lever associated with said first mentioned ramp element, and means operative, on displacement of said displaceable member, to effect upward movement of the second ramp element into its operative position so that while a trolley is held in the region of the first ramp element the drive to a following trolley will be discontinued in the region of said second ramp element.

5. An indexing mechanism as in claim 4 and further comprising a pivoted member so arranged in relation to the main track as to be actuated by any trolley released by the stop lever associated with the first ramp element, a first link means coupling said pivoted member to the angularly movable member cooperating with said first ramp element and a second link means coupling said pivoted member to an angularly movable member cooperating with the second ramp element, the arrangement being such that on actuation of the pivoted member by a trolley the first ramp element will be restored to its operative position while the second ramp element will be restored to its inoperative position.

6. An indexing mechanism as in claim 4 in which the displaceable member comprises a first pivoted lever carrying a roller adapted to be contacted by any trolley held by the stop lever associated with the first ramp element, there being a second pivoted lever operatively connected to the first to move therewith and link means connecting said second lever to an angularly movable member cooperating with said second ramp element the arrangement being such that actuation of the first pivoted lever will cause the angularly movable member to move the second ramp element into its operative position.

7. An indexing mechanism as in claim 4 wherein a plurality of ramp elements is disposed at spaced points along the conveyor path preceding the first ramp element, such additional ramp elements being adapted normally to assume inoperative positions but there being means whereby stoppage of a trolley in the region of one ramp element will result in movement of the immediately preceding ramp element into its operative position.

References Cited in the file of this patent

UNITED STATES PATENTS

| | | |
|---|---|---|
| 2,572,011 | Cohen et al. | Oct. 21, 1951 |
| 2,612,847 | Burrows | Oct. 7, 1952 |
| 2,619,370 | Leger | Nov. 25, 1952 |
| 2,619,916 | Rainier | Dec. 2, 1952 |
| 2,635,555 | Hansson | Apr. 21, 1953 |
| 2,741,190 | King | Apr. 10, 1956 |
| 2,885,969 | Kay et al. | May 12, 1959 |